United States Patent
Barz

(10) Patent No.: US 11,833,892 B2
(45) Date of Patent: Dec. 5, 2023

(54) REINFORCEMENT FOR DOOR PANEL OPENING

(71) Applicant: Zephyros, Inc., Romeo, MI (US)

(72) Inventor: Bill Barz, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 562 days.

(21) Appl. No.: 16/958,987

(22) PCT Filed: Jan. 2, 2019

(86) PCT No.: PCT/US2019/012027
§ 371 (c)(1),
(2) Date: Jun. 29, 2020

(87) PCT Pub. No.: WO2019/136048
PCT Pub. Date: Jul. 11, 2019

(65) Prior Publication Data
US 2020/0338967 A1    Oct. 29, 2020

Related U.S. Application Data

(60) Provisional application No. 62/612,950, filed on Jan. 2, 2018.

(51) Int. Cl.
*B60J 5/04*    (2006.01)

(52) U.S. Cl.
CPC .......... *B60J 5/0434* (2013.01); *B60J 5/0468* (2013.01)

(58) Field of Classification Search
CPC ...... B60J 5/0434; B60J 5/0468; B60J 5/0437; B60J 5/045; B60J 5/0451; E05B 1/00; E05B 5/00

USPC ..................... 296/146.6; 292/336.3
See application file for complete search history.

(56) References Cited

U.S. PATENT DOCUMENTS

| | | | |
|---|---|---|---|
| 5,439,260 A | 8/1995 | Weinerman | |
| 8,826,705 B2 * | 9/2014 | Tien | E05B 53/00 70/210 |
| 9,248,870 B2 | 2/2016 | Belpaire et al. | |
| 9,708,013 B2 | 7/2017 | Belpaire | |
| 11,312,212 B2 | 4/2022 | Dosdat et al. | |
| 2008/0211258 A1 | 9/2008 | Jenks | |
| 2012/0039665 A1 | 2/2012 | Richardson | |
| 2014/0165669 A1 | 6/2014 | Tien | |
| 2017/0036521 A1 * | 2/2017 | Ogawa | B60J 5/0431 |

(Continued)

FOREIGN PATENT DOCUMENTS

| | | |
|---|---|---|
| CN | 103025498 A | 4/2013 |
| CN | 204998309 U | 1/2016 |
| JP | H09146321 A | 6/1997 |

OTHER PUBLICATIONS

International Search Report & Written Opinion dated Mar. 27, 2019, Application No. PCT/US2019/012027.

(Continued)

*Primary Examiner* — Joseph D. Pape
(74) *Attorney, Agent, or Firm* — The Dobrusin Law Firm, PC

(57) ABSTRACT

A reinforcement assembly comprising a carrier including a connection means to connect to a panel, a rim portion for receiving an adhesive, the rim portion surrounding a central opening portion, and a plurality of apertures located in the rim portion, the apertures adapted for receiving the adhesive.

18 Claims, 4 Drawing Sheets

(56) References Cited

U.S. PATENT DOCUMENTS

2017/0240031 A1* 8/2017 Moriyama ............. B60J 5/0468
2018/0050474 A1 2/2018 Richardson

OTHER PUBLICATIONS

Chinese Office Action & Search Report dated Mar. 25, 2023, Application No. 201980007213.8.

* cited by examiner

REINFORCEMENT FOR DOOR PANEL OPENING

TECHNICAL FIELD

The present teachings relate generally to a reinforcing member for reinforcing an area surrounding an opening in a transportation vehicle door panel.

BACKGROUND

The transportation industry continues to require light-weighting efforts leading to the use of thinner materials that are more easily damaged and/or deformed. As a result, new methods and devices have been developed to reinforce these thin gauge, lightweight materials, especially in localized areas where stresses may be increased. Thin gauge metallic panels provide additional challenges in that many solutions for reinforcing the panels will result in undesirable read-through to the opposing surface of the panel.

It would therefore be desirable to provide structures for reinforcing thin gauge materials at locations where there may be openings for receiving inserts (e.g., door or tailgate handles) or at other areas on the panel that may be subject to increased stress as compared to surrounding areas. There is thus a need for improved means of reinforcing localized areas of a thing gauge material while avoiding read-through on the reinforced panel.

SUMMARY OF THE INVENTION

In a first aspect the present teachings contemplate a reinforcement assembly comprising a carrier including one or more openings for receiving one or more tabs, a rim portion for receiving an adhesive, the rim portion surrounding a central opening portion, and a plurality of apertures located in the rim portion, the apertures adapted for receiving the adhesive.

The tabs may be located in an opening in a panel section. The rim portion may completely circumscribe the central opening portion of the carrier. The one or more openings may be located on extended sections that extend inward into the central opening portion. The adhesive may be located onto a first surface of the carrier and the adhesive flows through the plurality of apertures when the adhesive is applied to the first surface.

The carrier may completely circumscribe an opening in a panel. The shape of the central opening portion may substantially corresponds to the shape of an opening in a panel. A largest diameter of the central opening portion may be larger than a largest diameter of an opening in a panel, but smaller than a largest diameter of the rim portion. A panel may receive the carrier and may include one or more tabs that are located into the one or more openings of the carrier. A panel may receive the carrier and may include one or more tabs that are located into the one or more openings of the carrier and each tab may be rotated toward the panel to assist securing the carrier in place.

The adhesive may be an activatable adhesive that activates upon exposure to a stimulus. The adhesive may be a structural adhesive material. The rim portion may be substantially rectangular or substantially elliptical in shape. Each of the plurality of apertures may be identical in shape and size. The plurality of apertures may vary in shape and size. The adhesive may have a green state viscosity so that it is resistant to flow when located within the plurality of apertures and prior to activation. The rim portion may include a first surface that may be substantially covered by the adhesive. The apertures may be shaped to hold the adhesive in contact with the first surface of the rim portion. The first surface of the rim portion may be located adjacent a panel so that the adhesive lies in direct planar contact with the panel.

The carrier may comprise an aluminum material. The adhesive may be overmolded onto the carrier. The adhesive may be dry to the touch. The adhesive may expand upon activation. The carrier may be a metal stamping. The carrier may be a metal stamping and the adhesive may be an overmolded epoxy-based adhesive. The reinforcement may be located adjacent an opening in a panel that receives a door handle.

The teachings herein further provide for a method of forming a panel reinforcer comprising stamping a metal part to include a central opening and a rim portion, locating a plurality of apertures in the rim portion, and overmolding an adhesive onto a first surface of the rim portion so that adhesive contacts the plurality of apertures.

The teachings herein also provide for a method for reinforcing a panel comprising stamping a metal part to include a central opening and a rim portion, locating a plurality of apertures in the rim portion, overmolding an adhesive onto a first surface of the rim portion so that adhesive contacts the plurality of apertures, forming a panel opening on the panel, locating the central opening about the panel opening so that the rim portion substantially surrounds the panel opening and the adhesive lies in direct contact with the panel, and optionally activating the adhesive to expand and/or cure.

The teachings herein are directed to devices and methods for reinforcing panels, especially in panel sections that include an opening and are thus particularly susceptible to weakness and/or damage about the opening.

DETAILED DESCRIPTION

Figure 1:
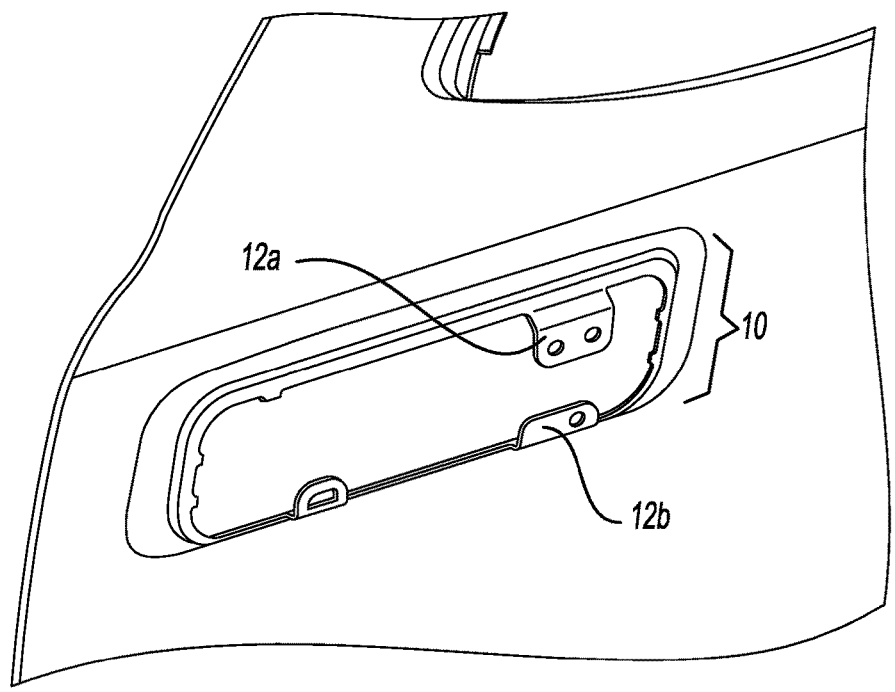
FIG. 1 shows a perspective view of a vehicle panel of the prior art.

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application No. 62/612,950, filed Jan. 2, 2018, the entirety of the contents of that application being hereby incorporated by reference for all purposes.

The reinforcement assembly described herein includes a carrier, one or more connection means for fastening the reinforcement to a panel, and a plurality of apertures for receiving an adhesive. The carrier may include a rim portion for receiving the adhesive, the rim portion surrounding a central opening portion in the reinforcement device.

The connection means may be formed by any mechanical fastening means. The connection means may comprise one or more openings for receiving one or more tabs located about an opening in a panel. The connection means may be located on extended sections that extend inward into the central opening portion. The adhesive may be located onto one or more surfaces of the carrier. The adhesive may be located only on a first surface of the carrier and the adhesive flows through the plurality of apertures when the adhesive is applied to the first surface.

Formation of the materials of the present teachings may include a variety of processing steps depending on the desired configuration of the materials. Various processes such as molding (e.g., compression, injection or other molding), extrusion or the like may be used to form the carrier material and the adhesive. The carrier and adhesive may be formed from a multi-shot injection molding process. The carrier may be a stamping and the adhesive may be over-molded onto the stamping.

The size and shape of the reinforcement assembly may depend upon the desired location of the device on a panel. The rim portion of the reinforcement assembly may be shaped so that it fits within a desired area of reinforcement. The rim portion may be sized so that it is complementary in shape to an opening in a panel. The rim portion may have a largest diameter or largest length that is larger than the largest diameter or largest length of an opening in a panel.

The tabs may be located in an opening in a panel section. The tabs may be present for engaging a reinforcement as described herein. One or more tabs may be present for connecting to an additional vehicle component. The tabs may be substantially solid or may include one or more openings. The tabs may be integrally formed with the panel. The tabs may be separately formed from the panel.

The rim portion may completely circumscribe the central opening portion of the carrier. The rim portion may have a substantially consistent width along its entirety. The width of the rim portion may vary. The rim portion may have a substantially consistent thickness. The thickness of the rim portion may vary. The rim portion may be substantially rectangular or substantially elliptical in shape.

The plurality of apertures may be located along the rim portion. The plurality of apertures may be formed on extended sections of the rim portion that extend inward into the central opening portion. The plurality of apertures may have a consistent shape and size. The plurality of apertures may vary among each aperture. The plurality of apertures may be stamped in the rim portion. The plurality of apertures may be die cut in the rim portion. The apertures may be shaped to hold the adhesive in contact with the first surface of the rim portion.

The adhesive may be located onto a first surface of the carrier. The adhesive may flow through the plurality of apertures when the adhesive is applied to the first surface. The first surface may be located into direct contact with a portion of a panel. The portion of the panel that contacts the adhesive may be located adjacent and/or substantially surround an opening in the panel.

The carrier may be located on the panel such that the central opening of the carrier completely circumscribes an opening in the panel. The shape of the central opening portion may substantially corresponds to the shape of an opening in a panel. The terminating inner edge of the central portion may be located close to the edge of an opening in a panel in an effort to effectively reinforce the panel at the edge of the opening (where it is most susceptible to damage). A largest diameter of the central opening portion may be larger than a largest diameter of an opening in a panel, but smaller than a largest diameter of the rim portion. The largest diameter of the central opening may be substantially similar to, or just larger than that of an opening in a panel that is reinforced by the reinforcement.

A panel may receive the carrier and may include one or more tabs that are located into the one or more openings of the carrier. Each tab may be rotated toward the panel to assist securing the carrier in place. The panel may include at least two tabs adapted for engaging the carrier. The panel may include only one tab adapted for engaging the carrier. The panel may be free of any tabs adapted for engaging the carrier.

The carrier may comprise a rigid polymeric material. The carrier may comprise a flat metal sheet. The carrier may comprise an aluminum material. The carrier may be a metal stamping. The carrier may also include a mesh material. The carrier may include a variety of other materials such as polymers, elastomers, fibrous materials (e.g., cloth or woven materials), thermoplastics, plastics, nylon, and combinations thereof. The carrier may be flexible to allow for bending of the reinforcement assembly to fit a curve of a panel structure.

After placement of the reinforcement assembly onto a panel, the adhesive may be an activatable material that expands, flows, cures or some combination thereof according to a predetermined set of conditions. For example, exposure to certain levels of heat may cause the adhesive to expand. The volumetric expansion of the adhesive may vary depending upon the reinforcement needs of a particular area of a panel. The adhesive may expand at least about 100% as compared to the unexpanded adhesive in its green state. The adhesive may expand less than about 2000%. The adhesive may expand at least about 500%, at least about 1000%, or more. The adhesive may expand less than about 1000% or even less than about 500%.

The adhesive may be a resinous generally dry to the touch or tacky and may be shaped in any form of desired pattern, placement, or thickness, but is preferably of substantially uniform thickness. Though other heat-activated materials are possible for the adhesive, a preferred heat activated material is an expandable polymer or plastic, and preferably one that is foamable. The adhesive may have a green state viscosity so that it is resistant to flow when located within the plurality of apertures and prior to activation.

The adhesive may be a heat-cured material. The adhesive material may cure at room temperature with no additional stimulus. The adhesive material may undergo an induction cure, a microwave cure, an ultra-violet activated cure, or a moisture cure, any of which may occur at room temperature or at an elevated temperature. The adhesive may cure via a redox reaction cure system. The adhesive material may comprise a two-component cure system wherein cure occurs upon mixing of the two-components. Typically, the adhesive material cures at temperatures in the range of about 15° C. to about 40° C.

The adhesive can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the adhesive is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The reinforcement assembly of the present teachings may be installed on an automotive vehicle although it may be employed for other articles of manufacture such as boats, buildings, furniture, storage containers or the like. The reinforcement may be located adjacent an opening in a panel that receives a door handle. The reinforcement assembly may be used to reinforce a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

Figure 2:
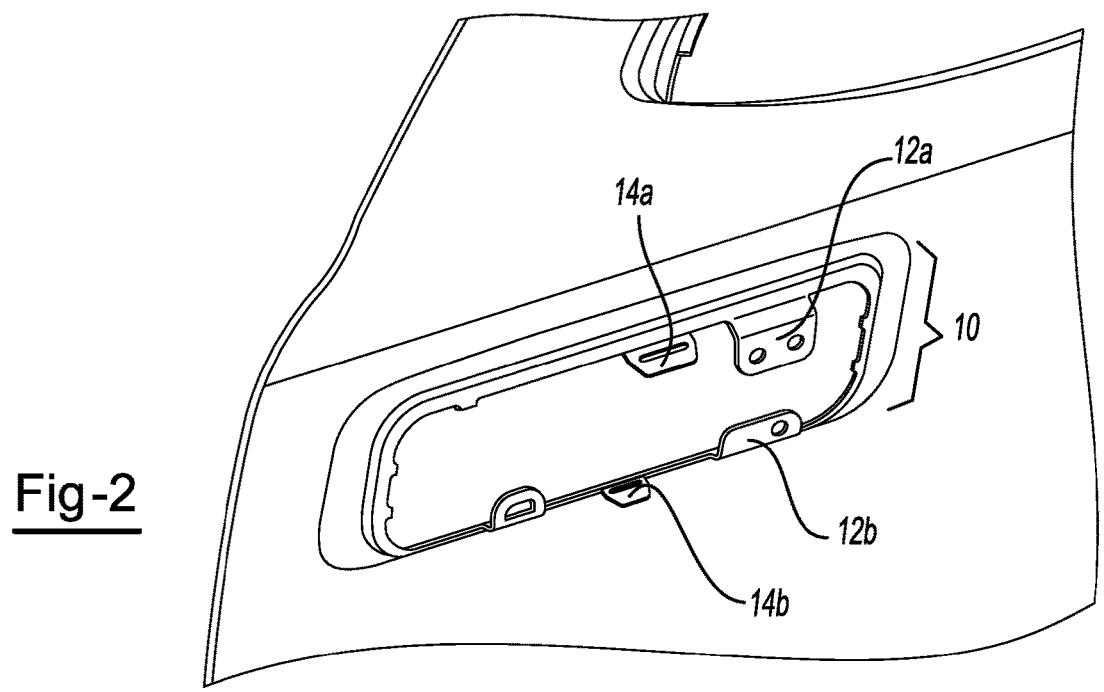
FIG. 2 shows a perspective view of an exemplary vehicle panel and opening in accordance with the present teachings.
Figure 3:
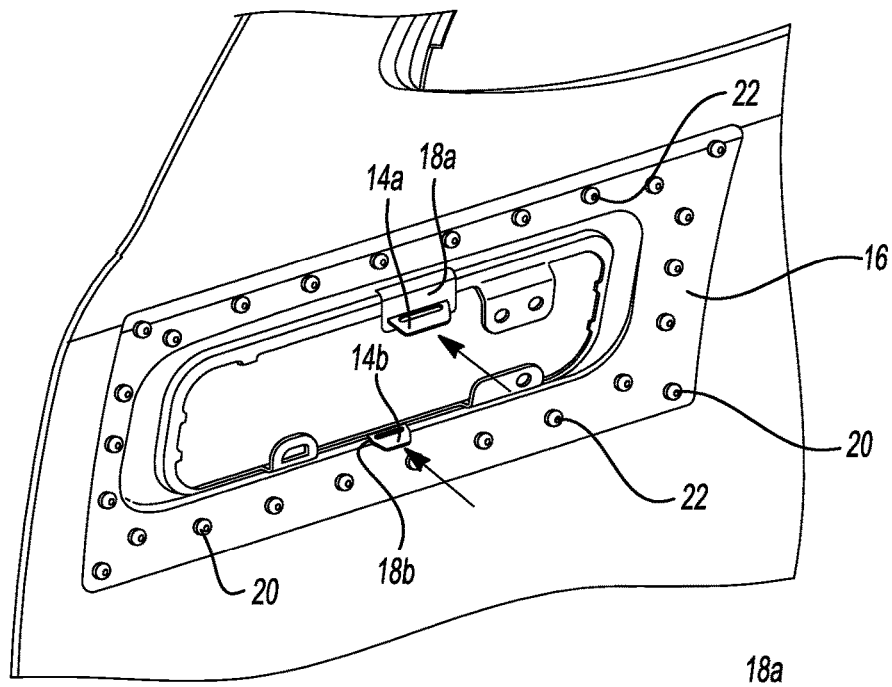
FIG. 3 shows a perspective view of the vehicle panel of FIG. 2 including an exemplary reinforcement device in accordance with the present teachings.
Figure 4:
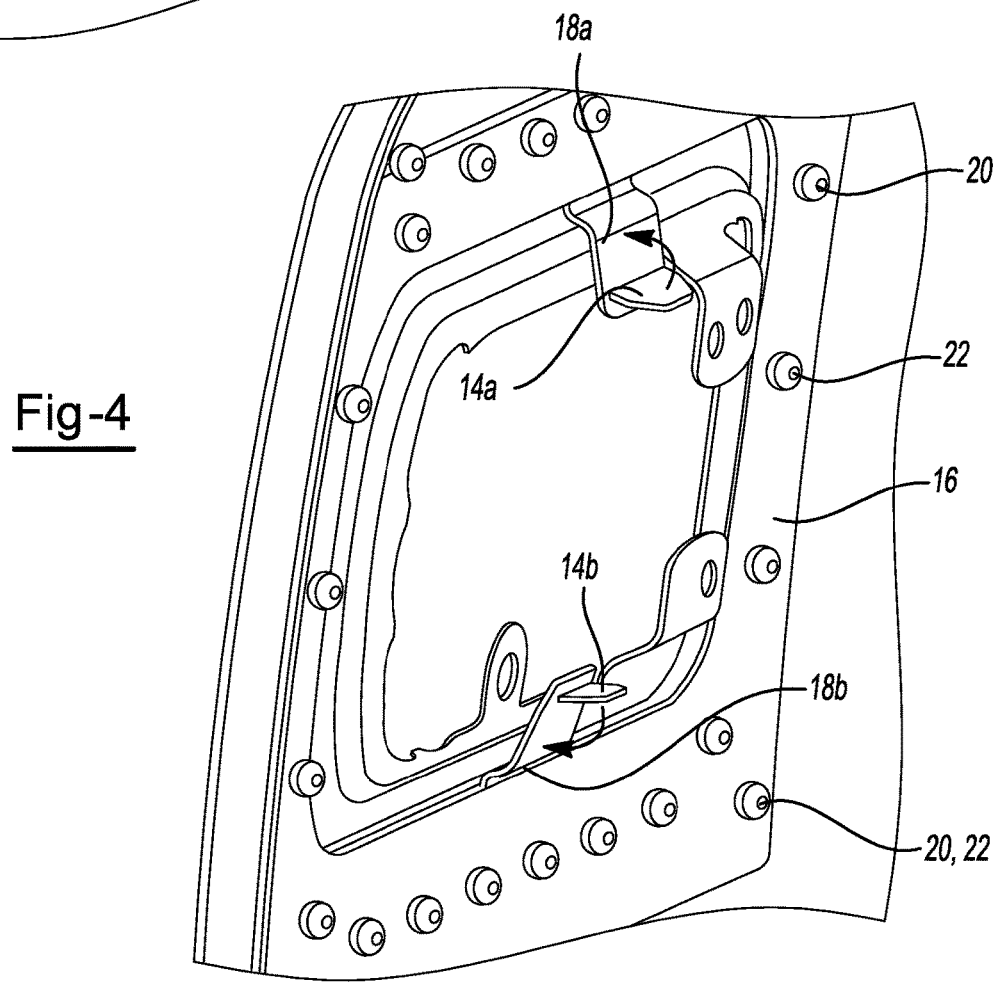
FIG. 4 shows a perspective view of the reinforcement device of FIG. 3 in use.
Figure 6A:
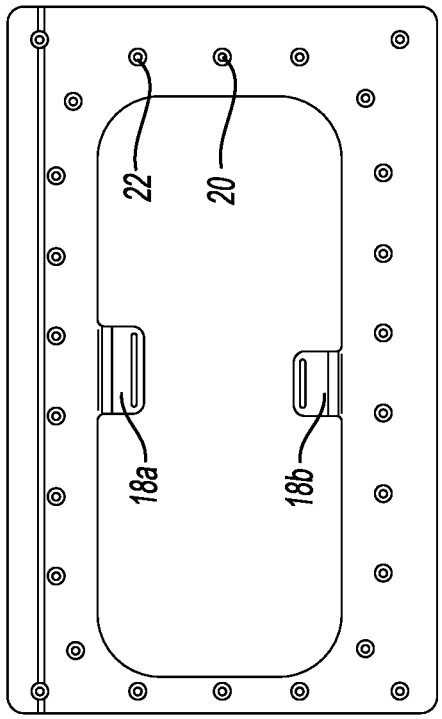
FIGS. 6A and 6B show opposing surfaces of the reinforcement device of FIG. 5.
Figure 6B:
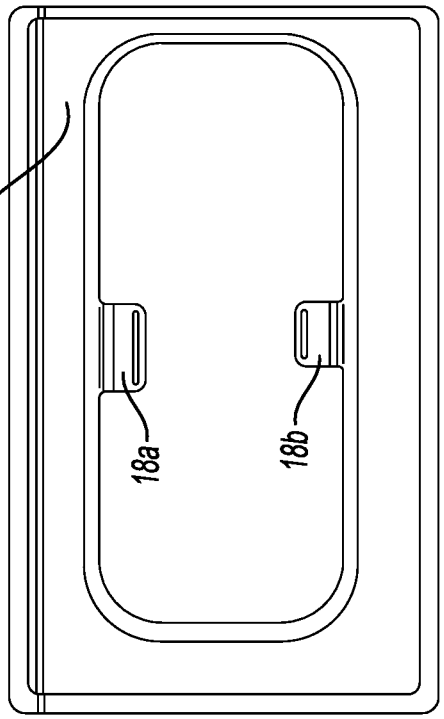
Figure 5:
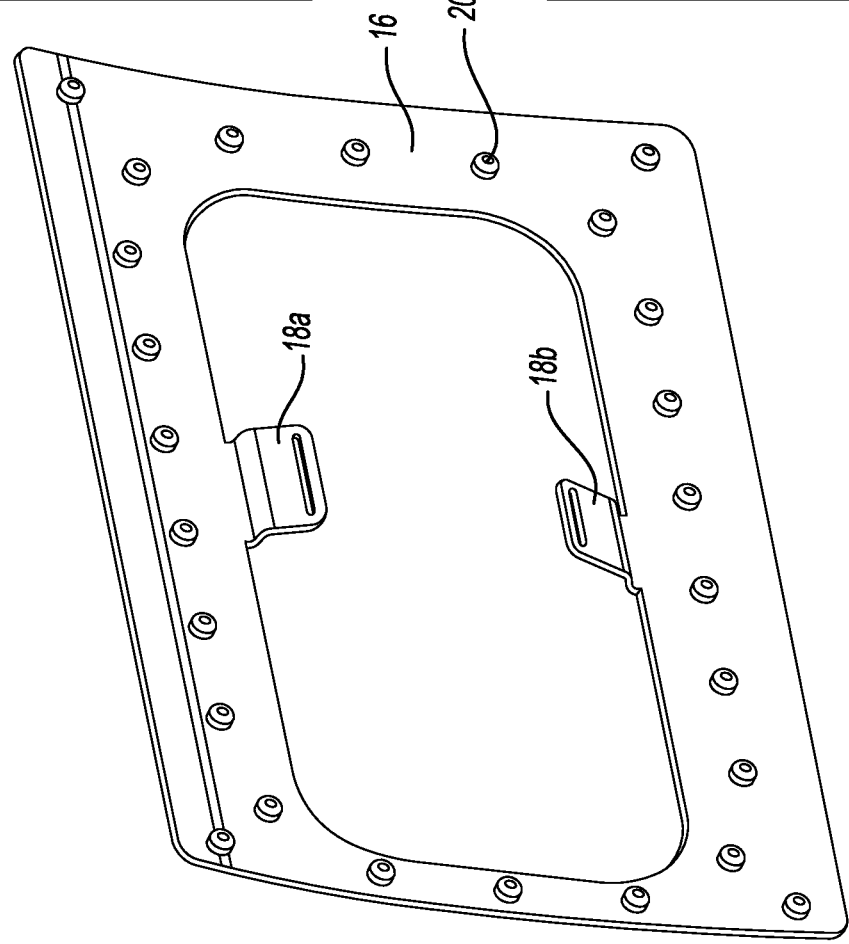
FIG. 5 shows a perspective view of the reinforcement device shown prior to attachment to a vehicle panel.
Figure 7A:
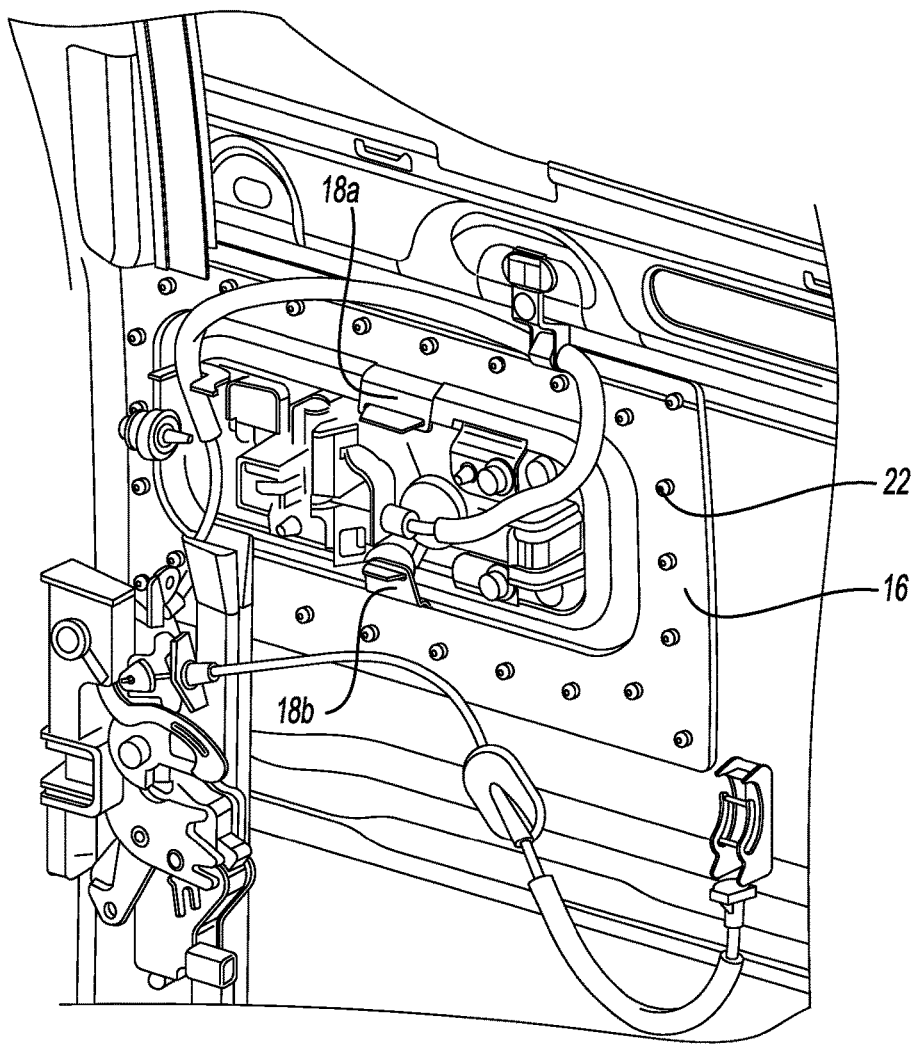
FIGS. 7A and 7B shows opposing views of a vehicle panel including the reinforcement device of FIG. 5.
Figure 7B:
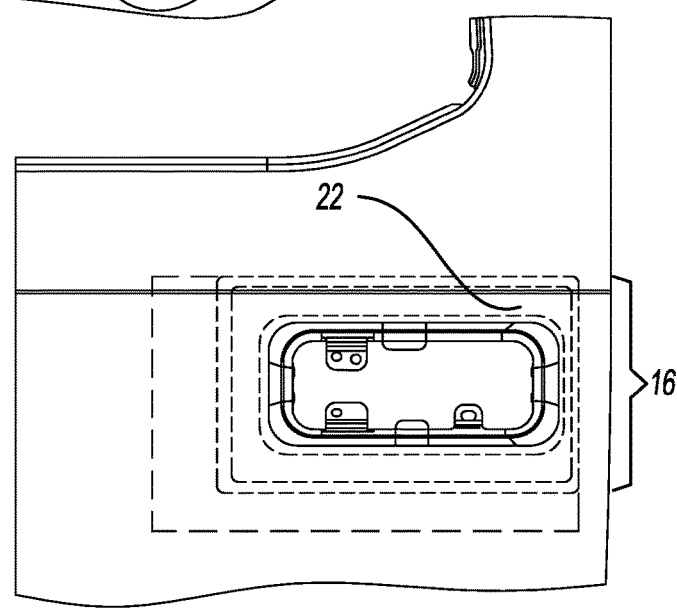

FIGS. 1-7 show an opening in a panel 10, including two tab portions 12a, 12b, as known in the prior art. The present teachings include the addition of two tab portions 14a, 14b for connecting to the carrier 16 of the present teachings. The carrier 16 includes one or more extender portions 18a, 18b including an opening that receives the two tab portions 14a, 14b located on the panel. The carrier 16 is further shown including a plurality of apertures 20 along a rim portion for receiving an adhesive material 22. The adhesive 22 is shown located onto a first surface of the carrier, but extending into and through the plurality of apertures 20.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A reinforcement assembly comprising:
    a carrier including:
        a) one or more openings for receiving one or more tabs;
        b) a rim portion for receiving an adhesive, the rim portion surrounding a central opening portion;
        c) a plurality of apertures located in the rim portion, the apertures adapted for receiving the adhesive; and wherein the tabs are located in the one or more openings in an extender portion.

2. The reinforcement of claim 1, wherein the rim portion completely circumscribes the central opening portion of the carrier.

3. The reinforcement of claim 2, wherein the carrier completely circumscribes the one or more openings in an extender portion a panel.

4. The reinforcement of claim 3, wherein the shape of the central opening portion substantially corresponds to the shape of an opening in the panel.

5. The reinforcement of claim 3, wherein the rim portion is substantially rectangular or substantially elliptical in shape.

6. The reinforcement of claim 1, wherein each of the plurality of apertures is identical in shape and size.

7. The reinforcement of claim 1, wherein the carrier comprises an aluminum material.

8. A reinforcement assembly comprising:
a carrier including:
a) one or more openings for receiving one or more tabs;
b) a rim portion for receiving an adhesive, the rim portion surrounding a central opening portion;
c) a plurality of apertures located in the rim portion, the apertures adapted for receiving the adhesive; and
wherein the one or more openings are located on extended sections that extend inward into the central opening portion.

9. The reinforcement of claim 8, wherein the adhesive is located onto a first surface of the carrier and the adhesive flows through the plurality of apertures when the adhesive is applied to the first surface.

10. The reinforcement of claim 8, wherein the adhesive is an activatable adhesive that activates upon exposure to a stimulus.

11. The reinforcement of claim 8, wherein the rim portion includes a first surface that is substantially covered by the adhesive.

12. The reinforcement of claim 11, wherein the apertures are shaped to hold the adhesive in contact with the first surface of the rim portion.

13. The reinforcement of claim 8, wherein the adhesive is dry to the touch.

14. A reinforcement assembly comprising:
a carrier including:
a) one or more openings for receiving one or more tabs;
b) a rim portion for receiving an adhesive, the rim portion surrounding a central opening portion;
c) a plurality of apertures located in the rim portion, the apertures adapted for receiving the adhesive; and
wherein a panel receives the carrier and includes the one or more tabs that are located into the one or more openings of the carrier.

15. A reinforcement assembly comprising:
a carrier including:
a) one or more openings for receiving one or more tabs;
b) a rim portion for receiving an adhesive, the rim portion surrounding a central opening portion;
c) a plurality of apertures located in the rim portion, the apertures adapted for receiving the adhesive; and
wherein a panel receives the carrier and includes one or more tabs that are located into the one or more openings of the carrier and each of the tabs is rotated toward the panel to assist securing the carrier in place.

16. A reinforcement assembly comprising:
a carrier including:
a) one or more openings for receiving one or more tabs;
b) a rim portion for receiving an adhesive, the rim portion surrounding a central opening portion;
c) a plurality of apertures located in the rim portion, the apertures adapted for receiving the adhesive; and
wherein the adhesive has a green state viscosity so that it is resistant to flow when located within the plurality of apertures and prior to activation.

17. A reinforcement assembly comprising:
a carrier including:
a) one or more openings for receiving one or more tabs;
b) a rim portion for receiving an adhesive, the rim portion surrounding a central opening portion;
c) a plurality of apertures located in the rim portion, the apertures adapted for receiving the adhesive; and
wherein a first surface of the rim portion is located adjacent a panel so that the adhesive lies in direct planar contact with the panel.

18. A reinforcement assembly comprising:
a carrier including:
a) one or more openings for receiving one or more tabs;
b) a rim portion for receiving an adhesive, the rim portion surrounding a central opening portion;
c) a plurality of apertures located in the rim portion, the apertures adapted for receiving the adhesive; and
wherein the carrier is a metal stamping and the adhesive is an overmolded epoxy-based adhesive.

* * * * *